(12) United States Patent
Strand

(10) Patent No.: US 6,938,423 B2  
(45) Date of Patent: Sep. 6, 2005

(54) METHOD FOR CONVERTION OF HEAT

(75) Inventor: Lennart Strand, Angelholm (SE)

(73) Assignee: Addpower AB, Angelholm (SE)

( * ) Notice: Subject to any disclaimer, the term of this patent is extended or adjusted under 35 U.S.C. 154(b) by 0 days.

(21) Appl. No.: 10/250,300

(22) PCT Filed: Dec. 25, 2001

(86) PCT No.: PCT/SE01/02891  
§ 371 (c)(1),  
(2), (4) Date: Dec. 16, 2003

(87) PCT Pub. No.: WO02/053879  
PCT Pub. Date: Jul. 11, 2002

(65) Prior Publication Data  
US 2004/0079080 A1 Apr. 29, 2004

(30) Foreign Application Priority Data  
Dec. 29, 2000 (SE) .............................................. 0004931

(51) Int. Cl.⁷ ............................................... F01K 7/34  
(52) U.S. Cl. ................................... 60/653; 60/39.182  
(58) Field of Search ..................... 60/653, 670, 39.02, 60/39.182

(56) References Cited

U.S. PATENT DOCUMENTS

| | | | | |
|---|---|---|---|---|
| 5,079,909 A | * | 1/1992 | Bruckner et al. | 60/39.12 |
| 5,285,627 A | * | 2/1994 | Losel et al. | 60/781 |
| 5,345,756 A | * | 9/1994 | Jahnke et al. | 60/781 |
| 5,661,968 A | * | 9/1997 | Gabriel | 60/39.182 |
| 5,724,807 A | * | 3/1998 | Schuetzenduebel et al. | 60/39.464 |
| 5,887,418 A | * | 3/1999 | Bruckner et al. | 60/783 |

FOREIGN PATENT DOCUMENTS  
WO WO 99/64138 * 12/1999

* cited by examiner

Primary Examiner—Hoang Nguyen  
(74) Attorney, Agent, or Firm—McGinn & Gibb, PLLC

(57) ABSTRACT

A method for conversion of heat in hot flue gases, vaporisation heat in the flue gases being released and converted into an energy carrier which converts from the liquid phase to gas phase.

4 Claims, 2 Drawing Sheets

METHOD FOR CONVERTION OF HEAT

Figure 1:
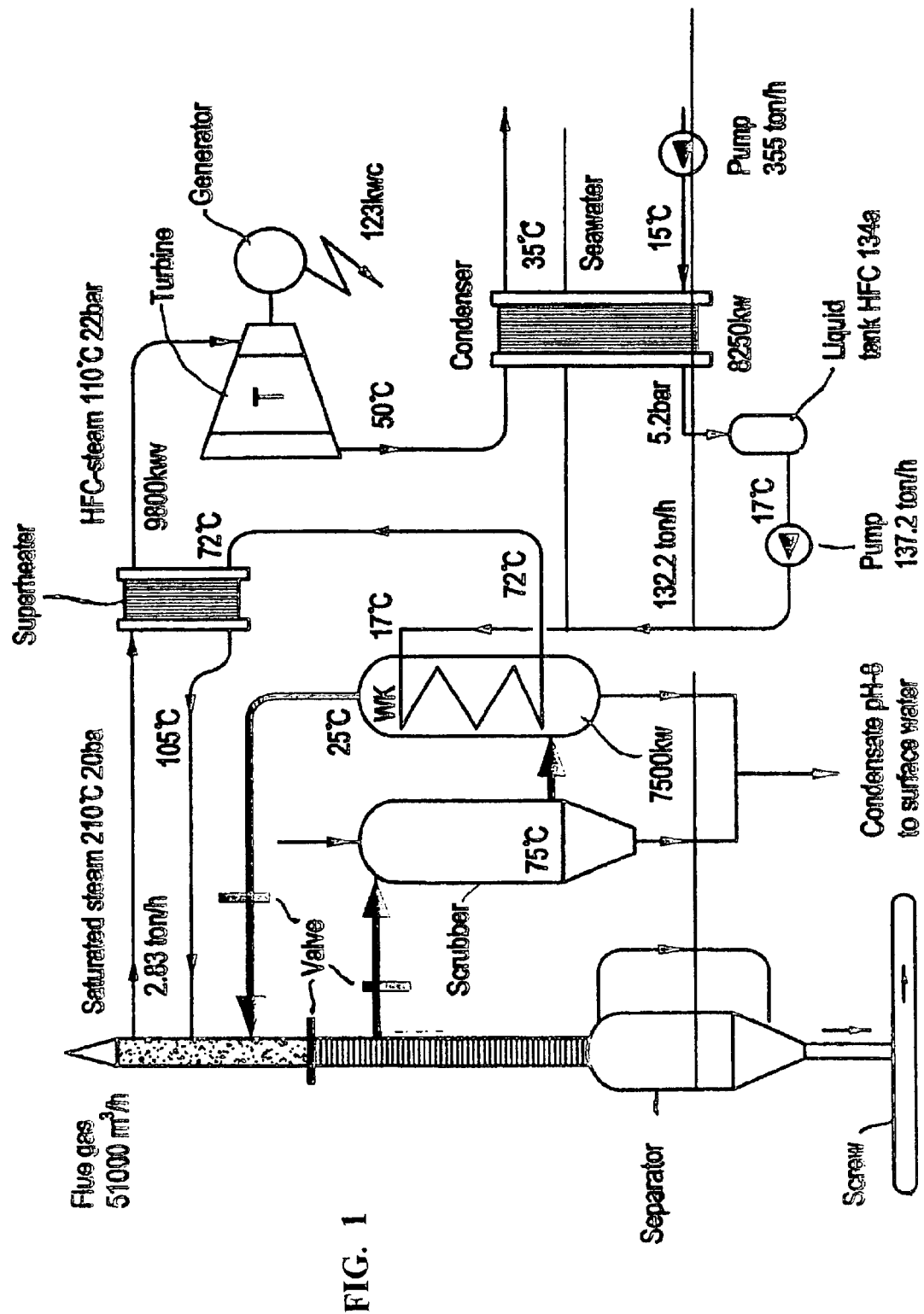
Figure 2A:
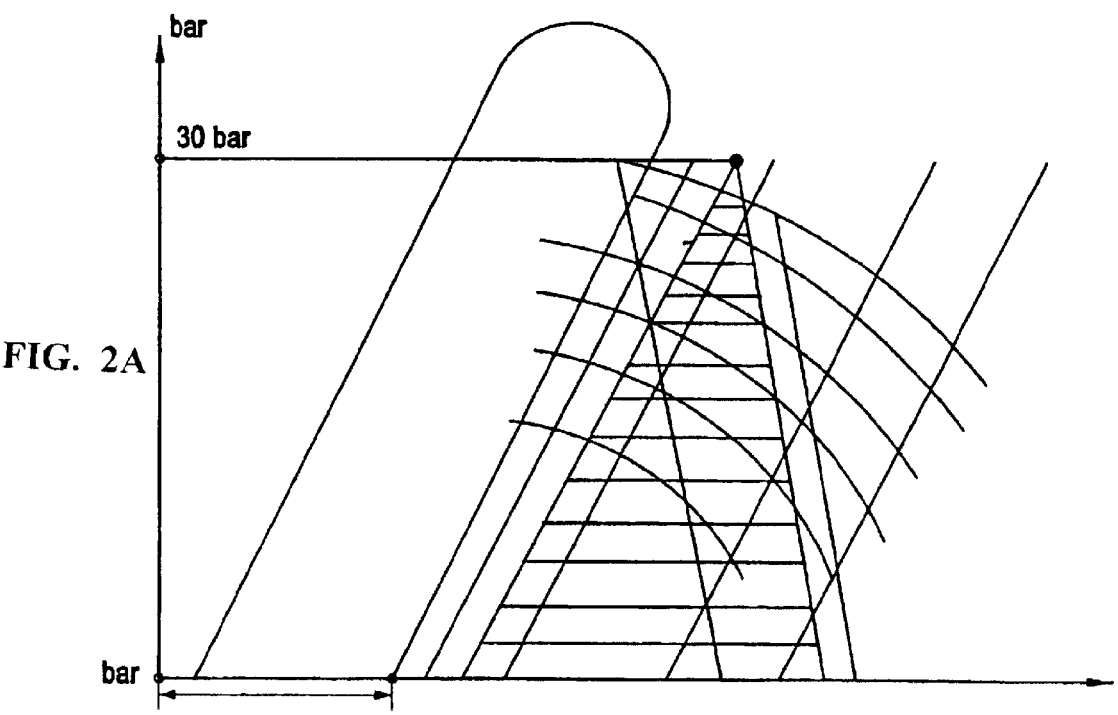
Figure 2B:
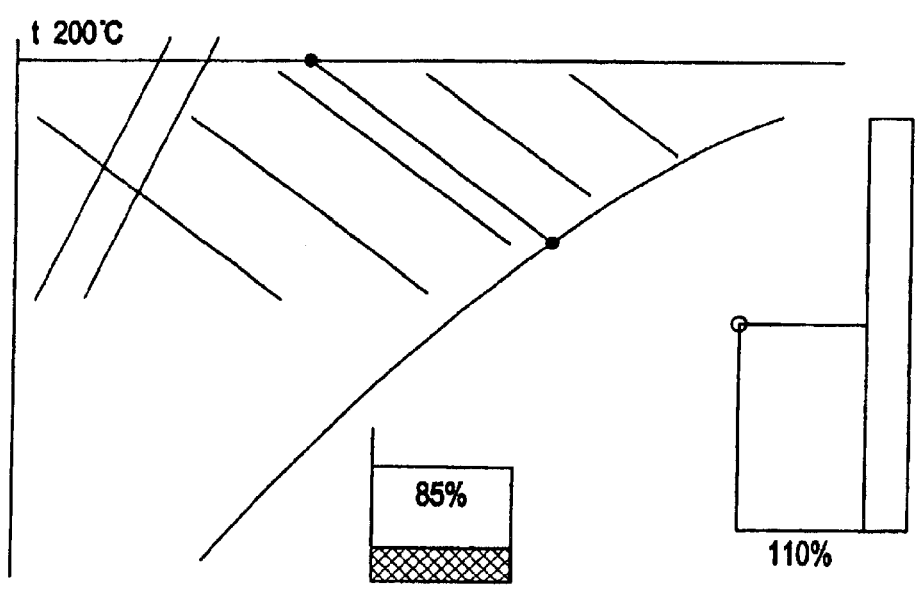

The present invention relates to a method for conversion of heat in hot flue gases whose energy content has fallen to such a level that a further reduction of energy could entail that the dew points of the flue gases may be fallen beneath in such a manner that the depositions of liquids cannot be prevented and in which the recovered energy may be converted into electric power at the same time that the cooling process by evaporative agglomeration entails that small condensed particles are made heavier and may thereby more readily be separated off from the flue gas.

We are daily being reminded about how our environment is constantly deteriorating. There are many explanations, but it is undisputed that the emissions of flue gases into the atmosphere have a not inconsiderable importance. It is, therefore, of paramount importance to utilise the fuel, the energy source, as far as is possible and convert the energy into electricity which is that type of energy which is the easiest to convert into other energy forms, at the same time as the purification or scrubbing of the flue gases becomes increasing important.

In hot flue gases, there is always water which derives from the fuel and the combustion air, The lower the moisture content in the fuel, the greater the quantity of water in the flue gases. In the combustion of the fuel, a large quantity of energy is consumed in vaporising the included water volume and this quantity of energy is bonded in the flue gas throughout the entire combustion cycle as so-called vaporisation heat. Energy cannot be released until the temperature in the flue gases is less than the dew point of the flue gases, which entails that free water is deposited at the same time as energy is released.

As a rule, the flue gases include many other substances such as, for example sulphur and which, in the combustion process, is converted into for example $SO_2$ and $SO_3$. At different temperatures, the condensed water reacts with, for example $SO_3$ which then becomes $H_2SO_4$, sulphuric acid. This sulphuric acid is corrosive and causes corrosion on the materials which are normally employed in flue gas ducts, chimneys etc. Further, a far-reaching temperate reduction entails that the dust which exists in the flue gases becomes tacky and, as a rule, obtains considerable adhesive power with the result that flue gas ducts, boiler tubes, chimneys etc. may easily become blocked, with operation disruption as a result. In order to avoid these operational disruptions and/or operational stoppages for repair and cleaning, the temperature of the flue gases is seldom reduced in the boiler which is provided for energy to be able to be converted to steam or hot water to temperatures which are less than 200° C. Variations naturally occur depending on fuel combustion equipment boiler, flue gas scrubbing equipment, chimney and also the prevailing environmental requirements.

The present invention makes possible a profitable investment since recovered energy is converted Into electricity and at the same time a superior cleaning or scrubbing effect will be obtained of the flue gases with a method which in principle takes place in nature but in the manner described here under completely controlled vaporisation heat in the flue gas is released and converted into an energy carrier possessing a specific property which, from the liquid phase, converts to the gas phase and which is superheated at a constant pressure by the flue gas before it has assumed a condensing state with the aid of water which bas been finely divided with the aid of ultrasound and which is rapidly vaporised in the flue gas stream because the water had also been preheated in a condenser where the energy carrier had condensed with the aid of the water once the energy carrier had given off much of its energy content by an isentropic expansion in an expander connected to a generator. The energy carrier is characterised in that it has low vaporisation heat and that it is capable of carrying high enthalpy at low temperature.

In the temperature reduction of the flue gases, a considerable quantity of water is released which contains numerous pollutants, from large dust particles to heavy metals which have condensed to particles, and acids which are formed such as, for example hydrochloric acid and sulphuric acid, The condensate must be purified before it is released to a recipient. If the flue gases had been released into the atmosphere without the above-described process, these pollutants would have been spread into nature. Tho present invention further entails that, depending on fuel quality, moisture content etc., up to approx. 35% additional energy can be recovered without extra fuel needing to be supplied. The economisation of fuel for future generations regardless of whether we save e.g. oil, natural gas, coal or biomass fuel will probably be of major importance.

Instead of, as in conventional plants, allowing the flue gas to be released into the atmosphere once the energy content has been utilised as far as possible, the present invention entails a considerably greater energy yield at the same time as much of the pollutants included in the flue gases are separated off and the degree of utilisation, or efficiency, of the fuel supplied is considerably improved.

A plant according to the present invention is exemplified on the accompanying drawing, and the diagrams exemplify the principle of the method according to the present invention.

What is claimed is:

1. A method of converting heat to another form of energy, said method comprising:

superheating a gaseous energy carrier with flue gas at a constant pressure;

expanding the superheated gaseous energy carrier in an energy converter to provide the other form of energy;

passing the gaseous energy carrier through a unit containing water to preheat the water;

applying sonic energy to the water to finely divide the water;

vaporizing the finely divided water in the flue gas to condense pollutants in the flue gas;

removing the pollutants from the flue gas; and releasing the flue gas.

2. The method of claim 1, further comprising driving an electrical generator with the unit through which the superheated gaseous energy carrier is passed, to generate electricity.

3. The method of claim 1, further comprising heating a liquid energy carrier to convert the liquid energy carrier to the gaseous energy carrier.

4. The method of claim 1, wherein the unit through which the superheated gaseous energy carrier is passed comprises a condenser to condense the energy carrier.

* * * * *